United States Patent [19]

Mühlhofer et al.

[11] Patent Number: 5,372,795

[45] Date of Patent: Dec. 13, 1994

[54] PROCESS FOR HYDROPHOBICIZING OF PYROGENIC SILICA

[75] Inventors: Ernst Mühlhofer, Oschle; Günter Kratel, Durach-Bechen; Peter Scherm, Emmerting, all of Germany

[73] Assignee: Wacker-Chemie GmbH, Munich, Germany

[21] Appl. No.: 148,237

[22] Filed: Nov. 8, 1993

[30] Foreign Application Priority Data

Dec. 3, 1992 [DE] Germany ............... 4240741

[51] Int. Cl.$^5$ ........................... C01B 33/20
[52] U.S. Cl. ................... 423/337; 423/267; 106/490; 106/491
[58] Field of Search .......... 423/337, 267; 106/33, 106/490, 491

[56] References Cited

U.S. PATENT DOCUMENTS

| | | | |
|---|---|---|---|
| 2,993,809 | 7/1961 | Bueche et al. | 423/337 X |
| 3,677,784 | 7/1972 | Nitzsche et al. | 106/490 |
| 3,772,427 | 11/1973 | Moore | 423/337 |
| 3,873,337 | 3/1975 | Läufer et al. | 106/490 X |
| 3,904,787 | 9/1975 | Trebinger et al. | 106/490 X |
| 3,924,029 | 12/1975 | Schutte et al. | 106/490 X |
| 3,953,487 | 4/1976 | Kratel et al. | 556/453 |
| 4,108,964 | 8/1978 | Kratel et al. | 423/336 |
| 4,292,290 | 9/1981 | Tunison | 423/336 |
| 4,503,092 | 3/1985 | Klebe et al. | 427/213 |
| 4,515,762 | 5/1985 | Greisshammer et al. | 423/337 |

FOREIGN PATENT DOCUMENTS

| | | |
|---|---|---|
| 0090125 | 10/1983 | European Pat. Off. . |
| 1234245 | 10/1960 | France . |
| 1163784 | 2/1964 | Germany . |
| 3115002 | 2/1982 | Germany . |
| 1093310 | 5/1986 | Japan ................ 423/337 |

*Primary Examiner*—Mark L. Bell
*Assistant Examiner*—David Sample
*Attorney, Agent, or Firm*—Martin Connaughton

[57] ABSTRACT

The invention relates to a process for continuously hydrophobicizing pyrogenic, finely divided silica, in which the waste gases are fed back to a mixing chamber upstream of the SiO$_2$ reaction flame.

2 Claims, 3 Drawing Sheets

PROCESS FOR HYDROPHOBICIZING OF PYROGENIC SILICA

FIELD OF INVENTION

The invention relates to a process for continuously hydrophobicizing pyrogenic, finely divided silica in which the waste gases are fed back into a mixing chamber upstream of the $SiO_2$ reaction flame.

BACKGROUND OF INVENTION

EP-B-90125 discloses a process for feeding back the reaction gases produced in the hydrophobicization of finely divided silica, which still contain, besides hydrogen chloride, appreciable amounts of un-reacted dimethyldichlorosilane, into the cooling zone downstream of the silica reaction flame. Thereby the amounts of dichlorodimethylsilane for HCl absorption are minimized.

SUMMARY OF INVENTION

The object of the invention is to provide a process for hydrophobicizing silica which reduces environmental pollution.

This object is achieved by a process for continuously hydrophobicizing pyrogenic silica from silicon halide compounds wherein the hydrophobicizing agents are organohalosilanes, and recycling all waste gases containing organic components into the mixing chamber upstream of the $SiO_2$ reaction burner and burning them in the $SiO_2$ reaction flame.

The pyrogenic silica produced from silicon halide compounds in a known manner (for example, DE-C-3115002; corresponding to U.S. Pat. No. 4,292,290) is hydrophobicized, after removal of the smoke fumes, by using an organohalosilane as hydrophobicizing agent, water vapor and passing in an inert gas. The hydrophobicization is preferably carried out countercurrently. Preferably, a hydrophobicizing aid is added.

Removal of the smoke fumes from the pyrogenic silica produced from the silicon halide compounds is effected using, for example, suitable filters. For hydrophobicizing the silica, it is then preferably passed downwards into a suitable silo like reaction space. The reaction space is preferably thermally insulated. It is heated to the temperature required for the hydrophobicization of the invention by the deposited hot silica. After the desired fill level has been reached, the reaction space is charged with a hydrophobicizing agent in vapor form, optionally a hydrophobicizing aid, water vapor and inert gas. These substances are preferably introduced into the lower third of the reaction space. The substances are metered in at a temperature between 110° and 140° C., preferably between 120° and 130° C., particularly preferably at 125° C. Preferably the hydrophobicizing agent, any hydrophobicizing catalyst and/or the water vapor will have been diluted with inert gas during metering.

The hydrophobicization of the silica is effected at temperatures of from 200° C. to 800° C., when using a hydrophobicizing aid at from 60° C. to 350° C., preferably from 80° C. to 150° C., over a period of from 2 to 5 min, preferably from 3 to 4 min.

The hydrophobicizing agent is selected from known organohalosilanes. Preference is given to alkylchloro compounds, particularly preferably dimethyldichlorosilane.

The hydrophobicizing aid used is preferably methanol. The inert gas used is preferably nitrogen.

The use of a hydrophobicizing aid makes it possible to carry out the hydrophobicization of pyrogenic $SiO_2$ with a considerably lower energy consumption than has been customary to date. Furthermore, this makes possible good hydrophobicization of the silica even at high silica throughputs.

According to the present invention, the waste gases produced in the hydrophobicization silo are collected, passed into the mixing chamber upstream of the $SiO_2$ burner, there mixed with the starting materials for producing pyrogenic $SiO_2$ and this mixture fed to the burner for producing pyrogenic silica and there burnt. The pyrogenic silica so produced is not qualitatively different from the customarily produced product, whereas a pyrogenic silica where the waste gases have been fed back into the annular slit of the burner would not achieve the quality of customary products.

The waste-gas recycling of the invention into the premixing zone of the reaction burner thus reduces the pollution of the environment by emissions, without reducing product quality.

In addition to this, the hydrochloric acid produced is not contaminated by organosilicon and organic components, so that this can be easily processed further.

Figure 1:
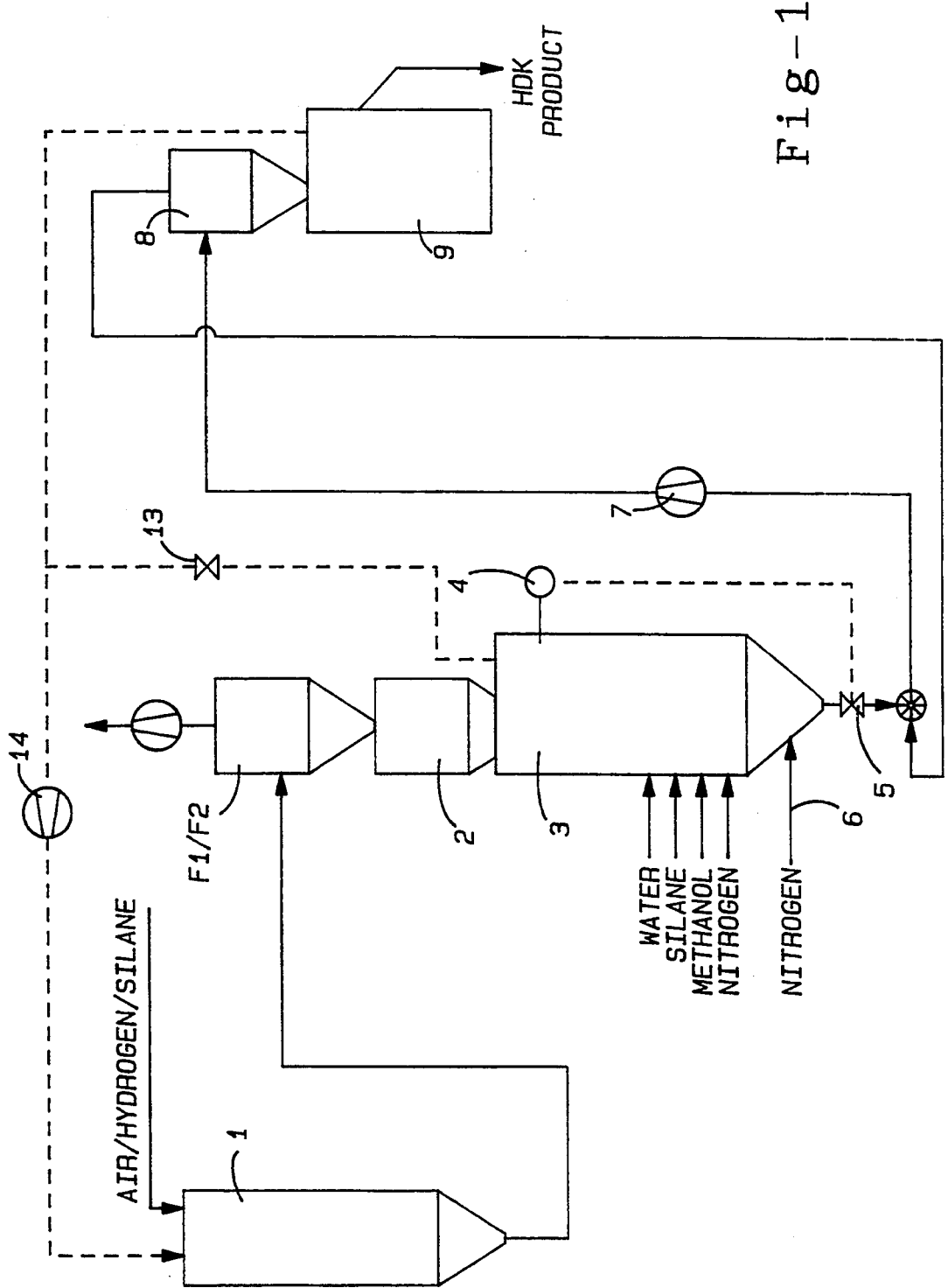
FIGS. 1, 2 and 3 show various embodiments of the process of the invention. However, the possible use of the process of the invention is not restricted to these embodiments.

In the embodiment shown in FIG. 1, silica is produced by burning an organohalosilane in a combustion chamber 1. This is effected, for example, by burning methyldichlorosilane with air. The filters F1/F2 remove the smoke fumes, which contain hydrogen chloride and chlorine, from the pyrogenic $SiO_2$. The silica passes via an intermediate funnel 2 into the reaction space, which hereinafter will be referred to as the hydrophobicization silo. In the hydrophobicization silo 3 the level of silica is sensed by a fill level sensor 4 which controls a regulator 5 to maintain the desired fill level. The fill level in the hydrophobicization silo is preferably determined using a radioactive fill level sensor. The regulator 5 preferably takes the form of a regulating flap. The lower third of the silo is charged in a metered fashion at a temperature of from 110° C. to 140° C. in vapor form, each vapor charge having been diluted with hot inert gas, with the hydrophobicizing agent, hydrophobicizing aid, water vapor and further inert gas.

Inert gas pulses 6 directly above the regulating flap 5 ensure the flow of silica through the regulating flap 5. This moreover prevents relatively large amounts of hydrogen chloride gas or of hydrophobicizing agent passing into the moving-bed dryer 9.

The hydrophobicized silica passes out of the hydrophobicization silo 3 via a conveying loop, comprising a blower 7 and a cyclone 8, to the moving-bed dryer 9. There the hydrophobicized silica is de-acidified. The waste gases from the moving-bed dryer are combined with the excess mixture from the hydrophobicization silo, comprising inert gas, hydrophobicizing agent, hydrophobicizing aid, with the hydrogen chloride produced in the hydrophobicization reaction and with the by-products formed, and, by means of a blower 14, mixed into the reaction mixture for producing the pyrogenic silica in the mixing chamber upstream of the burner. The stated waste gases from the hydrophobicization silo are taken from the hydrophobicization silo by means of a slide valve 13 and the pressure in the hydrophobicization silo is thus maintained at from 0 to 30 mbar. The carbon-containing compounds in the combined waste gases from the hydrophobicization silo 3 and the moving-bed dryer 9 are quantitatively burnt in the silica reaction flame.

Figure 2:
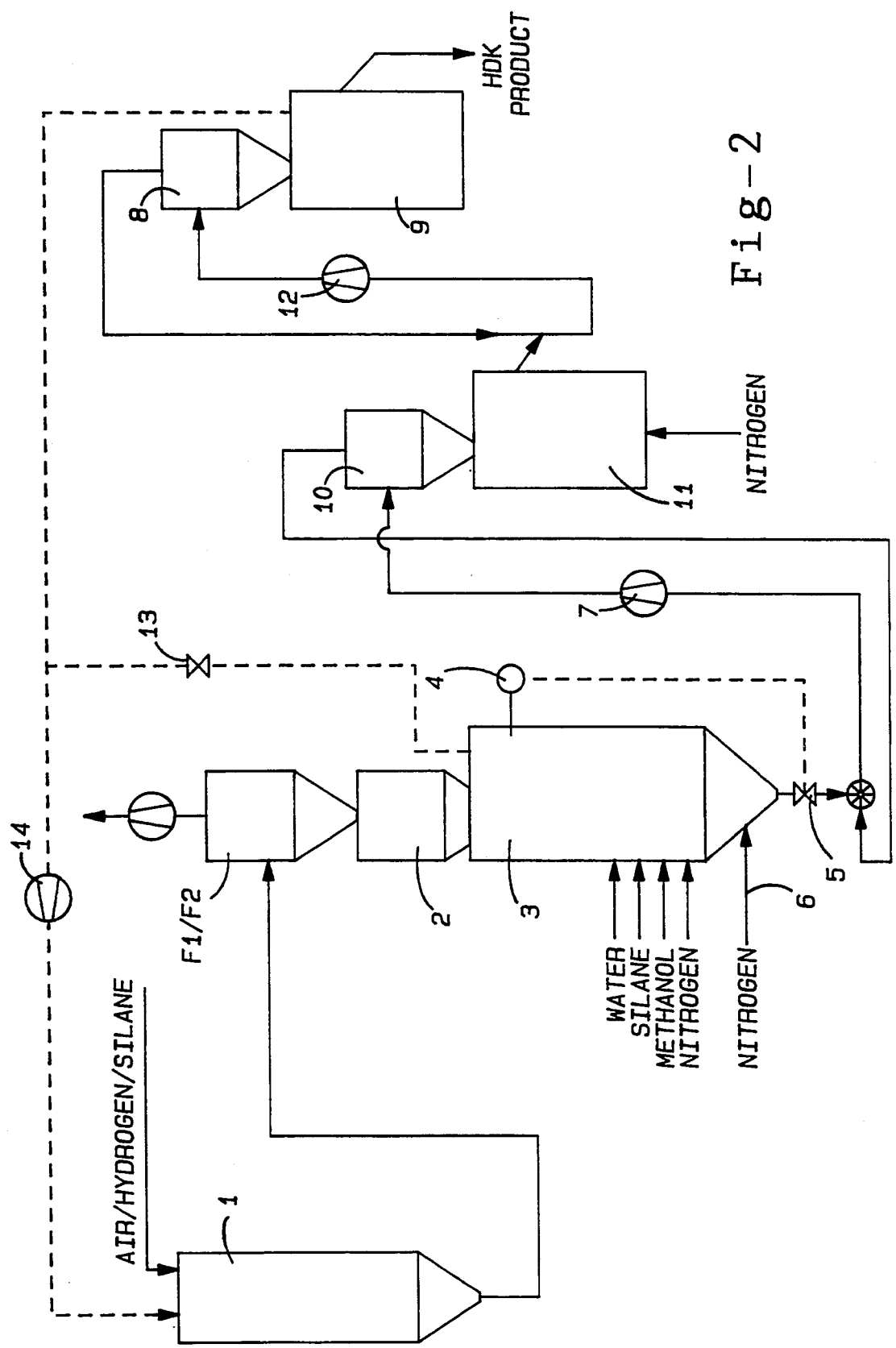

An alternative embodiment of the process of the invention is shown in FIG. 2. The production of the pyrogenic silica and the hydrophobicization using the hydrophobicizing aid are each effected as described for FIG. 1: the hydrophobicized silica is conveyed by a blower 7 and a cyclone 10 out of the hydrophobicization silo 3, via the regulating flap 5, into a fluidized-bed reactor 11. There it is heated to from 300° to 350° C. and then conveyed via a conveying loop comprising blower 12 and cyclone 8 into the moving-bed dryer 9. The use of the fluidized-bed reactor makes it possible to reduce the amount of hydrophobicizing aid which has to be used by up to 70% compared with the embodiment shown in FIG. 1. The waste gas from the hydrophobicization silo is, as described for FIG. 1, together with the waste gas from the moving-bed dryer, mixed into the reaction mixture for producing the silica in the premixing zone of the burner and quantitatively burnt in the reaction flame. The hydrophobicized $SiO_2$ passes from the moving-bed dryer to homogenization in silos.

Figure 3:
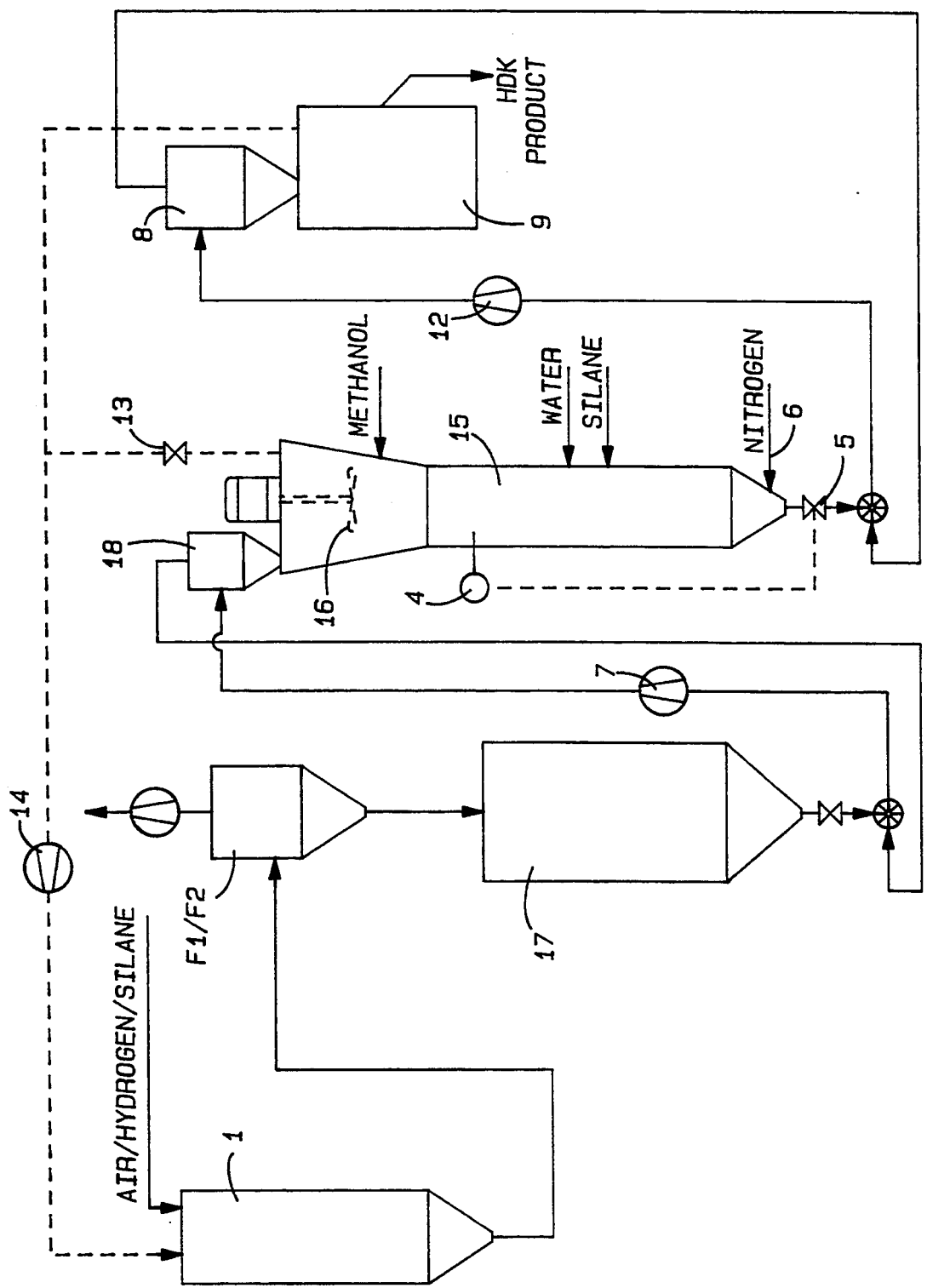

A further embodiment of the process of the invention, in which the hydrophobicization silo and fluidized-bed reactor form a single reactor, is described in FIG. 3: in a combustion chamber 1, silica is produced in a conventional manner by burning an organohalosilane. The filters F1/F2 are used to separate off the smoke fumes which contain hydrogen chloride and chlorine. The pyrogenic silica first passes into a buffer vessel 17 and from there via a blower 7 and a cyclone 18 into the reactor 15. The expanded upper part of the reactor 15 is preferably heated from the outside to a temperature of from 80° to 120° C. The reactor is equipped with a fill level sensor 4 which controls a regulator at the reactor outlet 5. Furthermore, the reactor is equipped in the upper part with a device for fluidizing the silica 16. A stirrer is particularly suitable for this purpose. A mixture of inert gas and hydrophobicizing aid is metered in at about 125° C. at the lower end of the top half of the reactor. At the lower end of the reactor, the walls of which are heated to about 350° C., a mixture of water vapor and inert gas and also a mixture of hydrophobicizing agent and inert gas are fed in in gas form via at least one inlet each. Preferably, pulsed nitrogen is metered in via a pulse regulating flap, for example. The hydrophobicized pyrogenic silica is transported by a conveying loop via the blower 12 and the cyclone 8 into a dryer, where it is de-acidified and conveyed into silos for homogenization. By means of a regulator 13, which is opened as far as required to maintain the gas pressure over the $SiO_2$ level somewhat below the blower pressure of the blower 7, the waste gas from the reactor is combined with the waste gas from the dryer 9 and fed via the blower 14 to the mixing chamber upstream of the $SiO_2$ burner. A hand-operated slide valve is, for example, suitable as regulator 13.

EXAMPLE 1

In a process corresponding to FIG. 1, the reaction flame, in which 108 kg/h of methyltrichlorosilane and hydrogen were burnt, deposited 43 kg/h of $SiO_2$ into the thermally insulated hydrophobicization silo.

The hydrophobicization silo, whose temperature was 135°–137° C. in the upper part and 109°–110° C. at its center and whose internal pressure was maintained at +13 and +29 mbar by means of a hand-operated slide valve 13, was charged in a metered fashion via separate lines with 4.5 kg/h of dimethyldichlorosilane (diluted with 0.8 m³/h of nitrogen), 3.3 kg/h of methanol (diluted with 0.8 m³/h of nitrogen), and 1.5–2 kg/h of water (diluted with 1 m³/h of nitrogen), each in gas form at 125° C.

In the upper part of the hydrophobicization silo, 1 m³/h of nitrogen was added. Through the level-regulating flap at the bottom end of the hydrophobicization silo 3 m³/h of nitrogen pulses were introduced. The hydrophobicized $SiO_2$ passed through the moving-bed dryer at temperatures between 240° C. and 280° C. and pressure of −4.5 mbar. 138 m³/h of waste gas from the dryer and the hydrophobicization silo were fed into the premixing zone of the reaction burner and burnt in the $SiO_2$ reaction flame. The surface-hydrophobicized $SiO_2$ so obtained has the following properties: BET surface area: 165 m²/g, pH: 4.1, Carbon content: 1.03%.

Comparative Example 1

Surface-hydrophobicized silica was prepared as in Example 1. Unlike Example 1, the collected waste gases were not fed into the mixing chamber upstream of the $SiO_2$ burner but into the annular slit of the burner and so to the reaction flame.

The surface-hydrophobicized $SiO_2$ so obtained has the following properties: BET surface area: 171 m²/g pH: 4.2, Carbon content: 1.21%.

Comparative Example 2

Surface-hydrophobicized silica was prepared as in Example 1. Unlike Example 1, the waste gases were not fed back to the reaction flame of the burner.

The surface-hydrophobicized $SiO_2$ so obtained has the following properties: BET surface area: 168 m²/g, pH: 4.2, Carbon content: 1.23%.

EXAMPLE 2

In a process corresponding to FIG. 2, the reaction flame, in which 108 kg/h of methyltrichlorosilane and hydrogen were burnt, deposited 43 kg/h of $SiO_2$ into a thermally insulated hydrophobicization silo 3. This hydrophobicization silo, whose temperature was 128° to 130° C. in the upper part and 103° to 108° C. at its center and whose internal pressure was maintained at +3 and +32 mbar, was charged in a metered fashion via separate lines with 4.8 kg/h of dimethyldichlorosilane (diluted with 0.8 m³/h of nitrogen), 1.0 kg/h of methanol (diluted with 0.8 m³/h of nitrogen) and 1.5 to 1.8 kg/h of water (diluted with 1 m³/h of nitrogen), each in gas form at 125° C. In the upper part of the hydrophobicization silo, 1 m³/h of nitrogen was added. Through the level regulating flap 5 4 m³/h of nitrogen pulses were introduced. Downstream of the hydrophobicization silo, the $SiO_2$ passed through the fluidized-bed reactor 11, to which a further 5 m³/h of nitrogen were added and in which the $SiO_2$ was brought to temperatures between 308° and 348° C. Pressure of −1 mbar was maintained in the fluidized-bed reactor. Downstream of the fluidized-bed reactor, the hydrophobicized $SiO_2$ was passed through a dryer at temperatures between 290° and 300° C. The combined waste gases from dryer, fluidized-bed reactor and hydrophobicization silo, having a flow of 145 m³/h, were fed into the premixing zone of the SiO₂ reaction burner and mixed with the starting materials for SiO₂.

The surface-hydrophobicized SiO₂ so obtained has the following properties: BET surface are: 173 m²/g, pH: 4.2, Carbon content: 1.05%.

Comparative Example 3

Surface-hydrophobicized silica was prepared as in Example 2. Unlike Example 2, the collected waste gases were not fed into the premixing zone of the SiO₂ burner but into the annular slit of the burner and so to the reaction flame.

The surface-hydrophobicized SiO₂ so obtained has the following properties: BET surface are: 169 m²/g, pH: 4.1, Carbon content: 1.01%.

Comparative Example 4

Surface-hydrobicized silica was prepared as in Example 2. Unlike Example 2, the waste gases were not fed back to the reaction flame of the burner.

The surface-hydrophobicized SiO₂ so obtained has the following properties: BET surface area: 176 m²/g, pH: 4.2, Carbon content: 1.07%.

EXAMPLE 3

The thickening effect of the surface-hydrophobicized SiO₂ samples from Examples 1 and 2 and the Comparative Examples 1 to 4 was determined by comparison of their individual thickening performances in a liquid polyester resin. In this test, 8 g of each of the SiO₂ samples were each dispersed in 192 g of polyester resin (Ludopal P6 obtainable from BASF, Ludwigshafen). Dispersion was carried out with a laboratory dissolver (Pendraulik) for 5 minutes at a speed of 2800 rpm. The thickening effect of the 4% strength finely divided silica/polyester resin dispersions was measured with equipment in accordance with DIN 53019.

The viscosities are shown below in Table I.

TABLE I

| Example | Viscosity |
| --- | --- |
| Example 1 | 4150 mPas |
| Comparative Example 1 | 3100 mPas |
| Comparative Example 2 | 4050 mPas |
| Example 2 | 4300 mPas |
| Comparative Example 3 | 3200 mPas |
| Comparative Example 4 | 4450 mPas |

What is claimed is:

1. A process for continuously hydrophobicizing pyrogenic silica from silicon halide compounds in the presence of an organohalosilanes hydrophobicizing agent and optionally a hydrophobicizing aid, water vapor and an inert gas; where (i) the silicon halide compounds are passed through a silicon reaction burner to produce pyrogenic silica; (ii) smoke fumes from the preparation of the pyrogenic silica are removed; (iii) the pyrogenic silica is then combined in a reaction space at elevated temperatures with the hydrophobicizing agent and optionally the hydrophobicizing aid, water vapor and inert gas; and (iv) the hydrophobicized pyrogenic silica is removed from the reaction space, wherein the improvement lies in;

(A) recycling waste gases from (iii) containing organic components into a mixing chamber upstream from a silica reaction burner, wherein the waste gases form a mixture with a reaction mixture for producing silica comprised of silicon halide compounds, and (B) burning the mixture of recycled waste gases and silicon halide compounds in a silica reaction flame to form pyrogenic silica, and (C) passing the thus obtained pyrogenic silica on to the hydrophobicization process.

2. A process as claimed in claim 1, wherein the waste gases from the hydrophobicization process and a moving-bed dryer are recycled and mixed with the reaction mixture for producing silica in a premixing zone of the reaction burner and quantitatively burned in the reaction flame.

* * * * *